United States Patent Office 2,978,449
Patented Apr. 4, 1961

2,978,449

POLYMERIC ISOCYANATES AND THEIR MANUFACTURE

Harold France and Arnold Lister, Manchester, England, assignors to Imperial Chemical Industries Limited, London, England, a corporation of Great Britain No Drawing. Filed Nov. 12, 1957, Ser. No. 695,491

Claims priority, application Great Britain Nov. 16, 1956

6 Claims. (Cl. 260—248)

This invention relates to polymeric isocyanates and to the manufacture thereof by the use of certain catalysts.

It has already been proposed to use a variety of catalysts for the polymerisation of organic diisocyanates and an even greater variety of catalysts have been proposed for the polymerisation of organic monoisocyanates. Two types of polymers from the monoisocyanates have been prepared, namely the dimers (substituted uretediones) of the general formula:

and the trimers (isocyanuric acid derivatives) of the general formula

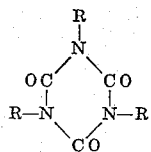

We have now found that certain basic catalysts are especially valuable for the rapid polymerisation of organic polyisocyanates and that these catalysts favour the formation of the trimeric form of the polymer, that is to say the isocyanurate type of polymer.

Thus according to the present invention we provide a process for the manufacture of polymeric organic isocyanates which comprises contacting an organic polyisocyanate with at least one basic catalyst selected from the class consisting of alkali and alkaline earth metal oxides, hydroxides, carbonates, alcoholates and phenates, alkali metal salts of enolisable compounds and metallic salts of weak aliphatic and alicyclic carboxylic acids.

Examples of specific suitable catalysts are sodium methoxide, potassium hydroxide, sodium acetate, potassium acetate, sodium and potassium carbonate, sodium phenate, sodium octyl phenate, sodio-acetoacetic ester, sodium stearate, sodium 2-ethylhexoate, lead 2-ethylhexoate, lead laurate, zinc naphthenate, lead naphthenate, cobalt naphthenate, manganese linoleate, Particularly effective catalysts are sodium methoxide, sodium acetate, lead 2-ethyl-hexoate and lead naphthenate.

The polymerisation process may be carried out in the absence or presence of a solvent for the polyisocyanate. Suitable solvents are esters such as ethyl acetate and butyl acetate, ketones such as acetone and methyl ethyl ketone, chlorform, benzene, toluene, xylene, monochlorbenzene, o-dichlorbenzene, phenolic materials, ethers such as diethyl and dibutyl ether and petroleum ethers or mixtures thereof. Ordinarily, a solvent is used in which the polymerised polyisocyanate is soluble. When the requisite degree of polymerisation has been achieved, further polymerisation may be prevented for example by mechanical removal of insoluble catalysts by filtration, this procedure being particularly convenient where the product is in solution. Alternatively, and especially in the case of soluble catalysts, the catalyst may be rendered inactive by treating the product with the calculated amount, or a slight excess thereof, of a strong acid such as anhydrous hydrogen chloride, sulphuric acid or phosphoric acid. If desired, the inactive insoluble matter so produced may be removed by filtration.

The solvent may also be chosen, wherein both polyisocyanate and catalyst are soluble, for example petroleum ethers, diethyl and dibutyl ether, so that the polymerised polyisocyanate separates from the reaction mixture.

The amount of catalyst required depends upon the activity of the catalyst and the nature of the polyisocyanate. Amounts within the range 0.01 to 10.0% of the polyisocyanate are generally found useful; in the case of catalysts of high activity, about 0.1% to 1% is suitable. Likewise the temperature of the reaction may vary widely. Usually the lowest practicable temperature is employed, even around normal atmospheric temperature; preferably temperatures below 200° C. are used. If too high a temperature is used, undesirable side-reactions and discolouration of the product occurs.

Any organic polyisocyanate or mixture of polyisocyanates may be polymerised according to the process of the present invention. Examples of such polyisocyanates are p-phenylene diisocyanate, 1-methoxyphenylene-2:4-diisocyanate, 3:3' - dimethyl - 4:4' - diisocyanatodiphenylmethane, diphenylene - 4:4'-diisocyanate, 4:4'-diisocyanatodiphenyl ether, naphthylene-1:5-diisocyanate, hexamethylene diisocyanate, diisocyanatodicyclohexylmethane, p-xylylene diisocyanate, isocyanatobenzyl isocyanates, 1:2:3:4:5:6 - hexahydrodiphenylene - 4:4'-diisocyanate, 4:4' - diisocyanato - 1:2:3:4:5:6-hexahydrodiphenylmethane, 1:2:3:4 - tetrahydronaphthylene - 1:5-diisocyanate, toluene-2:4:6-triisocyanate, 3-methyl-4:6:4'-triisocyanatodiphenylmethane, 2:4:4'-triisocyanatodiphenyl, 2:4:4'-triioscyanatodiphenyl ether. Polyisocyamates may be polymerised with aromatic mono-isocyanates such as phenyl isocyanate, tolyl isocyanates, chlorphenyl isocyanates or methoxyphenyliscoyanates. Organic diisocyanates that may especially advantageously be polymerised according to the process of the present invention are 2:- and 2:6-tolylene diisocyanates and mixture thereof, diisocyanatodiphenylmethane, m-phenylene diisocyanate, chlorophenylene 2:4-diisocyanate, m-xylylene diisocyanate and p-isocyanatobenzyl isocyanate. The isocyanurate polymer forms of these diisocyanates, which form a further feature of the present invention, are especially readily made by means of the catalysts used in the process of this invention, and these polymers may advantageously be used in a wide variety of processes in place of the parent diisocyanates.

The isocyanurate polymer forms of diisocyanates containing at least one aliphatically linked isocyanate group, or cycloaliphatically linked isocyanate group, attached to an aromatic nucleus are especially valuable because they have an enhanced curing activity compared with the present diisocyanate while lacquer films cured therewith show good colour retention.

The presence of isocyanurate type of polymer in polymeric aromatic isocyanates made by the process of this invention may be demonstrated by the presence in the infra-red spectrum thereof of well-defined absorption bands of 5.85 and 7.05 microns, the optical densities of which increase with the degrees of polymerisation. These bands are typical of isocyanurate structures, as exemplified by triphenyl-isocyanurate. Dimeric forms of isocyanate polymers show absorption bands at 5.60 and 7.18 microns.

It is known that isocyanates may be used in many processes in the form of their reaction products with, for example, phenols, acetoacetic esters, malonic esters and diphenylamine. In a similar manner, the isocyanate polymers made by the process of this invention may also be used in the form of reaction products with such compounds, these reaction products behaving as free isocyanates at elevated temperatures. These reaction products may be advantageously used in place of the free polymers where long pot-life of, for example, resin lacquers therefrom is desired or where isocyanate-reactive solvents are used.

The isocyanate polymers may be used either as the substantially monomer-free practically fully converted polymer or in solution in the polyisocyanate from which they are derived, or in admixture with other polyisocyanates. Likewise they can be used in solution in organic solvents, such as chloroform, methylene dichloride, esters, ketones or benzene hydrocarbons, depending upon the particular solubility of the polymer in question.

Any monomer contained in the isocyanate polymers made according to the processes of this invention may be removed or substantially eliminated by distillation of the monomer under reduced pressure in absence or presence of the vapour of an inert liquid such as mono- or dichlorobenzene or by precipitating the polymer from solution by addition of a second solvent in which the monomer is soluble and the polymer substantially insoluble, for example dialkyl and petroleum ethers.

The isocyanate polymers and their above defined reaction products have a variety of applications: as adhesives, as curing agents for resins, as components of or as curing agents for isocyanate modified polyester or polyether raw rubbers, or as isocyanates for producing special effects in both elastic and rigid cellular materials. The toxic hazard of volatile diisocyanates, for example tolylene diisocyanates, can be virtually overcome by the use of the substantially completely converted isocyanate polymer therefrom while still retaining active isocyanate groups. This is of particular value when isocyanates are used in conditions of poor ventilation.

The invention is illustrated but not limited by the following examples in which parts and percentages are by weight.

Example 1

A mixture of 155 parts of mixed 2:4- and 2:6-tolylene diisocyanates of isomer ratio about 65:35 and strength 97% and 0.775 part sodium methoxide is rapidly stirred with exclusion of moisture while being heated in an oil bath. At about 120° C., reached in about 1 hour, an exothermic reaction occurs causing the temperature to rise to about 150° C. The reaction quickly subsides and heating is continued with a bath temperature of about 120° C., the mixture progressively thickening and finally solidifying in about 1 hour. The cold product forms a a pale amber coloured brittle solid, melting at 150–160° C., and decomposing at 195° C. It contains 22.7% NCO groups, whereas the original isocyanate possesses 46.8% NCO groups, and its infra-red spectrum shows strong absorption bands at 5.85 and 7.05 microns, characteristic of tri-aryl substituted isocyanurate ring, in addition to absorption at 4.35 microns due to the isocyanate group.

Example 2

A mixture of 50 parts tolylene-2:4-diisocyanate (strength 98.7%) and 0.05 part sodium methoxide is stirred under conditions to exclude moisture at 100±2° C. for about 12 hours and then filtered hot through a sintered glass filter to remove the catalyst. The cold product forms a clear yellow oil wholly soluble in acetone, chloroform and benzene. It contains 34.3% NCO groups, the infra-red absorption characteristics being similar to those of Example 1. The original tolylene-2:4-diisocyanate contains 47.65% NCO groups.

Example 3

A mixture of 50 parts tolylene-2:4-diisocyanate (strength 98.6%) and 0.05 part sodium methoxide is stirred as in Example 2 at 100±2° C. After about 12 hours a further 0.15 part of sodium methoxide is added and stirring is continued at this temperature for a further 9 hours. The now viscous product solidifies to a pale amber coloured brittle resin on cooling, analysis showing the presence of 26.0% NCO groups, the infra red absorption characteristics being similar to those of Example 1.

Example 4

3 parts of sodium methoxide and 200 parts of distilled diisocyanatodiphenylmethane (strength 99.4%) are stirred with exclusion of moisture for about 4 hours at 100±2° C. The liquid product, when filtered from catalyst, contains 25.6% NCO groups compared with the original diisocyanate which has an NCO content of 33.4%, the infra red absorption spectrum showing strong bands at 5.85 and 7.05 microns as well as at 4.35 microns.

The diisocyanate used in this example is prepared as follows:

The crude diamine obtained from condensation of excess aniline with formaldehyde in the presence of hydrochloric acid in the known way is purified by distillation at 4 mm. pressure when a mixture of 2:4'- and 4:4'-diaminodiphenylmethane distils at about 214–223° C. This is phosgenated in o-dichlorobenzene solution and the resulting diisocyanatodiphenylmethane is purified by distillation when it boils at about 195–200° C./6 mm.

Example 5

200 parts distilled diisocyanatodiphenylmethane (strength 98.1%), as used in Example 4, and 2 parts sodium methoxide are mixed and rapidly stirred as previously described at 100±2° C. for about 12 hours. The viscous liquid product analyses for 22.6% NCO groups.

The product may be freed from catalyst by warming to 45–50° C., and, while stirring, adding 1100 parts dry chloroform. After stirring for a short time, the mixture is filtered and the clear yellow solution thus obtained is evaporated under reduced pressure (about 30 mm.). Residual solvent is finally removed as far as possible by heating at about 100° C. under a pressure of 0.4 mm. for about ½ hour. The cooled product is an extremely viscous straw-coloured resin containing 18.2% NCO groups, the infra red absorption characteristics being similar to those of Example 4.

Example 6

A mixture of 50 parts tolylene 2:4-diisocyanate (strength 98.6%) and 0.25 part fused powdered sodium acetate is stirred at 100±2° C.) as in the foregoing examples. The viscosity of the product noticeably increases in the course of 6 hours and heating is continued for a total time of about 8 hours. On cooling, it forms a brittle pale amber resin containing 24.9% NCO groups, the original isocyanate contains 47.6% NCO groups, the infra red absorption characteristics being similar to those of Example 1.

Example 7

1.65 parts of a solution of lead 2-ethylhexoate in white spirit containing 24.5% by weight of lead is added to 150 parts of mixed 2:4- and 2:6-tolylene diisocyanate (as used in Example 1) at about 60° C. and the solution is stirred at 60–65° C. for about 3½ hours with exclusion of moisture, the reaction being slightly exothermic. The catalyst is neutralised by adding 1.6 parts of the mixed tolylene diisocyanates in which hydrogen chloride has been previously dissolved to the extent of 7.45%. The cold liquid product, when filtered from insoluble matter, has an NCO value of 40.0%, the infra red absorption characteristics being similar to those of Example 1.

Example 8

50 parts of distilled diisocyanatodiphenylmethane as used in Example 4 are treated at about 45° C., with 0.19 part of a solution of lead 2-ethylhexoate in white spirit containing 24.5% by weight of lead and the mixture is stirred in the absence of moisture at 45±10° C. for about 6 hours, during which time the viscosity of the mixture gradually increases. The catalyst is then neutralised by adding the equivalent of 0.07 part hydrogen chloride previously dissolved in about 2 parts of diisocyanatodiphenylmethane and the mixture is stirred for a further hour at 45±1° C. The liquid product, which partially solidifies on standing, has an NCO value of 29.6%, the infra red absorption characteristics being similar to those of Example 1.

*Example 9*

A stirred solution of 75 parts of an isomeric mixture of toluylene-2:4- and 2:6-diisocyanates, isomer ratio about 65:35, NCO content 47.0%, in 75 parts ethyl acetate with 0.68 part of a solution of lead 2-ethyl hexoate in white spirit, lead content 24.5%, is boiled under reflux for 24 hours under conditions of exclusion of moisture. 0.9 part of a solution of dry hydrogen chloride in ethyl acetate, strength 6.54%, is then added with stirring. The NCO content of the product is then 10.7%, the infra red absorption characteristics being similar to those of Example 1 after allowance has been made for absorption by ethyl acetate.

In place of lead 2-ethylhexoate there may be used 0.75 part of a solution of lead naphthenate in white spirit (lead content 24.0%) when the NCO content falls to 10.7% after a reaction time of about 18 hours.

*Example 10*

A solution of 95.3 parts of an isomeric mixture of tolylene-2:4- and 2:6-diisocyanates, isomeric ratio about 65:35, NCO content 47.0%, in 93.4 parts ethyl acetate with 0.48 part sodium methoxide is stirred at room temperature for 23 hours. 6.5 parts of a solution of dry hydrogen chloride in ethyl acetate, strength 6.54%, is then added and stirred. The solution is filtered and gives a product of NCO content 12.5%, the infra red absorption characteristics being similar to those of Example 9.

*Example 11*

21.7 parts of the isocyanurate polymer of 2:4/2:6-tolylene diisocyanate, prepared as in Example 1, are dissolved in about 75 parts of dry acetone and the mixture is filtered from a small amount of insoluble matter. To the clear solution thus obtained, 12.25 parts of phenol are added and the stirred solution is heated to about 140° C. in the course of about 2 hours, during which time acetone distills off. The now viscous resin is heated for about a further 3 hours at 140–150° C. On cooling it forms a pale amber brittle solid, soluble in acetone. The infra red absorption shows strong bands at 5.85 and 7.05 microns, there being substantially no absorption due to NCO groups at 4.35 microns.

*Example 12*

A mixture of 0.6 part of a solution of lead 2-ethylhexoate in white spirit, lead content 24.5%, and 30 parts of hexamethylene diisocyanate (strength 98.5%) is stirred with exclusion of moisture at 60–62° C. for about 6 hours and then for about 48 hours at ordinary temperature. The NCO content had fallen from 48.1% to 26.8%. The catalyst is destroyed by the addition of 0.85 part of a 6.54% solution of dry hydrogen chloride in ethyl acetate.

*Example 13*

A stirred solution of 50 parts of 2:4-tolylene diisocyanate (strength 98.4%), 50 parts of ethyl acetate and 1 part of a solution of manganese linoleate in white spirit, manganese content 6%, is heated at 80–85° C. for about 8 hours under conditions of reflux with the exclusion of moisture. The NCO content of the product is then 10.2%. The catalyst may be inactivated for example by addition of hydrogen chloride as in Example 9.

*Example 14*

A solution of 100 parts 2:4-tolylene diisocyanate (strength 98.4%) in 100 parts monochlorbenzene containing 1 part of a solution of lead 2-ethylhexoate in white spirit, lead content 24.5%, is stirred at 80–85° C. for about 24 hours with the exclusion of moisture. The catalyst is inactivated by the addition of 1.45 parts of a solution of hydrogen chloride in ethyl acetate containing 0.067 gram hydrogen chloride per millilitre. The NCO content of the product is 14.4%.

Alternatively, the lead 2-ethyl hexoate may be replaced by 0.5 part of sodium p-octylphenate, and the mixture stirred first for 16 hours at 22±2° C. and then for 2 hours at 65±1° C. The resulting syrupy solution contains 9.2% NCO groups.

*Example 15*

A mixture of 260 parts chlorphenylene-2:4-diisocyanate, 260 parts ethyl acetate and 2.9 parts of a solution of lead 2-ethylhexoate in white spirit, lead content 25.0%, is stirred with exclusion of moisture at 49–51° C. for about 5 hours, after which it is cooled to about 5° C. The NCO content falls from 21.4% before addition of catalyst to 10.6%. The catalyst is destroyed by the addition of 4.06 parts of a solution of dry hydrogen chloride in ethyl acetate which contains 0.0613 gram of hydrogen chloride per millilitre. If desired, the product may be then filtered from insoluble lead chloride to give a clear amber coloured liquid.

*Example 16*

A mixture of 50 parts of 2:4-tolylene diisocyanate (98.7% strength equivalent to 46.5% NCO groups) and 0.5 part anhydrous potassium carbonate is stirred with exclusion of moisture while the temperature is slowly raised. At about 75° C. reached in ¾ hour the reaction becomes exothermic and the temperature is controlled at 115±5° C. When the reaction subsides the now viscous product is heated for a further 10 minutes at about 110° C. after which it is allowed to cool. The resulting brittle amber resin which is soluble in acetone and chloroform contains 22.35% NCO groups, and shows infra red absorption characteristics similar to those of Example 1.

In place of potassium carbonate there may be used 0.25 part powdered potassium hydroxide, the reaction being likewise exothermic from about 80° C. The product is a brittle amber resin containing 22.0% NCO groups and shows similar infra red absorption characteristics.

*Example 17*

A mixture of 50 parts of 2:4-tolylene diisocyanate and 2 parts of calcium hydroxide is rapidly stirred with exclusion of moisture at 150±2° C. for 36 hours. The liquid product when filtered from catalyst contains 41.2% NCO groups compared with 46.5% NCO groups in the original isocyanate while the the presence of isocyanurate polymers can be detected in its infra-red spectrum by absorption bands at 5.85 and 7.05 microns.

When 2.5 parts barium oxide are used in place of calcium hydroxide and otherwise proceeding as above, the filtered liquid product contains 42.5% NCO groups and shows similar infra red absorption characteristics.

*Example 18*

A mixture of 2:4-tolylene diisocyanate (strength 98.7%, equivalent to 46.5% NCO groups) and 0.5 part of the sodium derivative of ethyl acetoacetate is stirred with the exclusion of moisture. The resulting polymerisation reaction is strongly exothermic and the temperature of the mixture rises spontaneously from 25° C. to 75–80° C. in the course of ¼ hour. Thereafter the temperature is raised to 100±2° C. over ¼ hour and there maintained for ¼ hour. The now viscous product solidifies on cooling to a brittle resin containing 23.3% NCO groups, the infra red absorption characteristics being similar to those of Example 1.

Example 19

A mixture of 40 parts of m-xylylene diisocyanate $C_6H_4(CH_2NCO)_2$ of strength 98.1% and 0.9 part of a solution of lead 2-ethylhexoate in white spirit (lead content 25.0%) is stirred at 60±1° C. for about 6 hours with exclusion of moisture. The cold product is a thick syrup containing 23.6% NCO groups whereas the original isocyanate contains 42.8% NCO groups. The infra-red spectrum of a solution in chloroform shows strong absorption bands at 5.9 and 6.85 microns, absorption bands at these wavelengths being also shown by tribenzyl isocyanurate.

If desired the product may be dissolved in an equal weight of ethyl acetate and, after neutralisation of the catalyst as described in Example 9, the mixture is filtered to yield a clear almost colourless solution.

Example 20

A solution of 15 parts 2:4:6-triisocyanatotoluene in 30 parts ethyl acetate is stirred at 50±20° C. with exclusion of moisture. After addition of 0.17 part of a solution of lead 2-ethylhexoate in white spirit (lead content 25.0%) heating is continued at this temperature for about 4 hours. The clear mobile liquid now contains 12.3% NCO groups in contrast to the original solution which has an NCO content of 19.5%.

The catalyst is inactivated by addition of 0.25 part of a solution of dry hydrogen chloride in ethyl acetate, strength 6.54%, and the clear filtered solution evaporated below 40° C. at a pressure of 15 mm. to give a practically white solid which is soluble in acetone or ethyl acetate. Its infra-red spectrum shows strong chloroform in the regions of 5.7 and 7.1 microns indicating the presence of isocyanurate polymers.

Example 21

A mixture of 52.2 parts of mixed 2:4- and 2:6-tolylene diisocyanates of isomer ratio about 65:35, 17.85 parts phenyl isocyanate and 0.18 part powdered potassium hydroxide is stirred with exclusion of moisture. The temperature is raised from 25° C. to about 90° C. over ¾ hour when the reaction becomes exothermic and the temperature rises over 5 minutes to 115–120° C. at which it is controlled until the reaction subsides. Thereafter heating is continued at 115–120° C. for about ¼ hour, the product now being a viscous resin which becomes brittle on cooling. It is soluble in acetone and chloroform and contains 18.5% NCO groups whereas the original mixture of isocyanates contains 45.0% isocyanate groups. Its infra red absorption characteristics are similar to those of Example 1.

Example 22

A mixture of 62.5 parts of the ethyl acetate solution of the isocyanate polymers of mixed tolylene diisocyanates as made in Example 9, 54 parts Cellosolve acetate, purified from isocyanate reactive impurities, and 16.5 parts phenol is heated with exclusion of moisture. Ethyl acetate commences to distil off when the temperature of the mixture reaches 90° and distillation is continued until the reaction temperature is 158–160° C. At this stage, reached in about 2 hours, distillation of ethyl acetate is essentially complete and heating is continued under reflux conditions at 165–167° C. for a further 2½ hours. The cooled product is a yellow viscous liquid.

What we claim is:

1. A process for the preparation of isocyanate group-containing isocyanurate compounds by polymerizing organic polyisocyanates comprising polymerizing an organic polyisocyanate at a temperature from around room temperature to below 200° C. in the presence of lead 2-ethylhexoate and interrupting the reaction after the formation of isocyanurate rings detectable by infra-red absorption at 5.85 and 7.05 microns.

2. A process for the preparation of isocyanate group-containing isocyanurate compounds by polymerizing organic polyisocyanates comprising polymerizing an organic polyisocyanate at a temperature from around room temperature to below 200° C. in the presence of lead laurate and interrupting the reaction after the formation of isocyanurate rings detectable by infra-red absorption at 5.85 and 7.05 microns.

3. A process for the preparation of isocyanate group-containing isocyanurate compounds by polymerizing organic polyisocyanates comprising polymerizing an organic polyisocyanate at a temperature from around room temperature to below 200° C. in the presence of zinc naphthenate and interrupting the reaction after the formation of isocyanurate rings detectable by infra-red absorption at 5.85 and 7.05 microns.

4. A process for the preparation of isocyanate group-containing isocyanurate compounds by polymerizing organic polyisocyanates comprising polymerizing an organic polyisocyanate at a temperature from around room temperature to below 200° C. in the presence of lead naphthenate and interrupting the reaction after the formation of isocyanurate rings detectable by infra-red absorption at 5.85 and 7.05 microns.

5. A process for the preparation of isocyanate group-containing isocyanurate compounds by polymerizing organic polyisocyanates comprising polymerizing an organic polyisocyanate at a temperature from around room temperature to below 200° C. in the presence of cobalt naphthenate and interrupting the reaction after the formation of isocyanurate rings detectable by infra-red absorption at 5.85 and 7.05 microns.

6. A process for the preparation of isocyanate group-containing isocyanurate compounds by polymerizing organic polyisocyanates comprising polymerizing an organic polyisocyanate at a temperature from around room temperature to below 200° C. in the presence of manganese linoleate and interrupting the reaction after the formation of isocyanurate rings detectable by infra-red absorption at 5.85 and 7.05 microns.

References Cited in the file of this patent

UNITED STATES PATENTS

| | | |
|---|---|---|
| 2,671,082 | Stallman | Mar. 2, 1954 |
| 2,683,144 | Balon et al. | July 6, 1954 |
| 2,801,244 | Balon | July 30, 1957 |

OTHER REFERENCES

Bayer: "Angewandte Chemie," Ausgabe A/59 Jahrg. 1947, Nr. 9 (September 1947), pages 257 to 288 (only page 267 relied upon).

Saunders et al.: "Chemical Reviews," vol. 43, pages 203–218 (1948).

White: The Journal of the Society of Dyers and Colourists, vol. 70, No. 11, p. 482 (1954).

Arnold et al.: Chemistry of Organic Isocyanates, pages 19 to 33 (particularly page 26), Du Pont Bulletin HR–2, Jan. 1, 1956, published by Du Pont de Nemours & Co. Wilmington 98, Delaware.

Arnold et al.: J. Chem. Educ., vol. 34, pages 158–59, April 1957.